F. BLAIR.
FLOUR-SIEVE.

No. 172,693. Patented Jan. 25, 1876.

WITNESSES:
C. Neveux
Alex O. Roberts

INVENTOR:
F. Blair
BY
ATTORNEYS.

UNITED STATES PATENT OFFICE.

FERDINAND BLAIR, OF PLEASANTON, KANSAS.

IMPROVEMENT IN FLOUR-SIEVES.

Specification forming part of Letters Patent No. 172,693, dated January 25, 1876; application filed December 4, 1875.

*To all whom it may concern:*

Be it known that I, FERDINAND BLAIR, of Pleasanton, Linn county, Kansas, have invented a new and Improved Flour-Sieve, of which the following is a specification:

This invention relates to supporting the rotating crank-shaft of the sifter upon arms which are bent upward at the middle; the object being to provide a space at the center of the concave wire bottom of the sifter for reception of hard particles in the flour, or worms, insects, or other foreign bodies, as hereinafter described.

Figure 1:
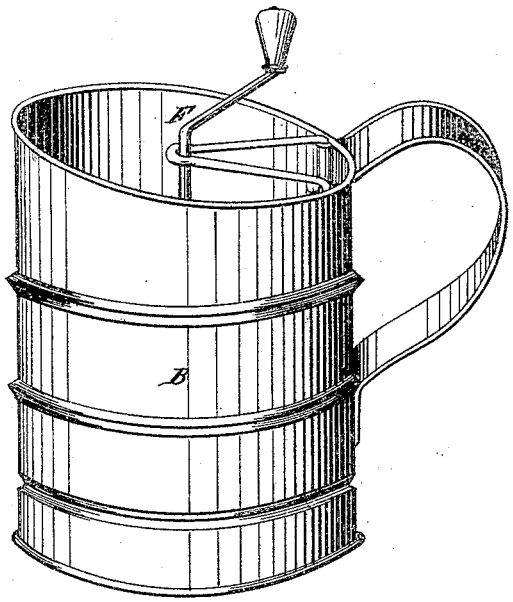
Figure 2:
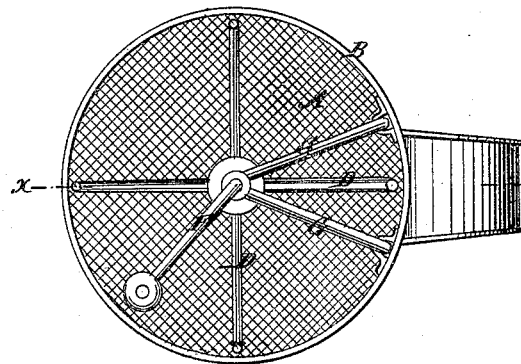
Figure 3:
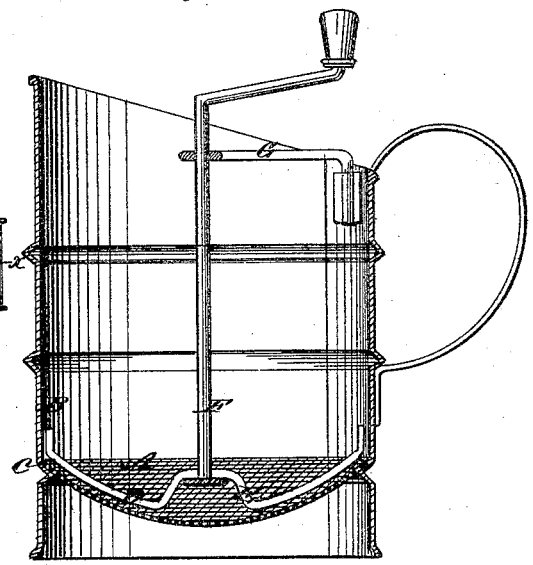

Figure 1 is a perspective view of my improved flour-sieve. Fig. 2 is a top view, and Fig. 3 is a sectional elevation.

Similar letters of reference indicate corresponding parts.

A is the concave screen, which is fastened to the case B by soldering it on the upper side of the inwardly-projecting flange C. D represents the arms for working the flour through the sieve, said arms being bent upward in the middle, E, where they are attached to the shaft F, so that they will work over insects and other objects without crushing and forcing them through the screen. Another function of the space thus formed beneath the shaft is to receive lumps or hard particles of the flour which will not readily pass through the screen. The concave shape of the screen facilitates the gathering of the objects in the space under the raised portion of the arms. The shaft is supported at the upper end in detachable bearings G, so that it can be readily taken out for using the sieve as a scoop, for which it is suitably contrived.

I am aware of Patents No. 144,225 and No. 138,976, and disclaim the construction and arrangement of parts therein shown and described.

What I do claim is—

In a flour-sifter, the arms D, bent upward in the middle, in combination with the shaft F, supported thereon, and the concave screen, as shown and described, for the purpose specified.

FERDINAND BLAIR.

Witnesses:
    Z. T. STARNES,
    S. DECKER.